United States Patent [19]

Ulrich

[11] 3,952,810

[45] Apr. 27, 1976

[54] SLIT TRENCHING AND CABLE LAYING DEVICE

[75] Inventor: Raymond M. Ulrich, Washington, Ill.

[73] Assignee: Ulrich Foundation, Inc., Washington, Ill.

[22] Filed: June 27, 1974

[21] Appl. No.: 483,679

[52] U.S. Cl. ................................ 172/40; 37/142.5; 37/193; 61/72.6; 172/400; 172/413; 172/537; 280/43.23; 404/124; 404/128
[51] Int. Cl.² ..................... F16L 1/02; E02F 5/18
[58] Field of Search ............. 172/40, 537, 400, 413; 37/193, 142.5; 61/72.6; 404/124, 123, 128; 280/43.23

[56] References Cited
UNITED STATES PATENTS

| | | | |
|---|---|---|---|
| 2,118,553 | 5/1938 | Garlinger | 61/72.6 |
| 2,519,002 | 8/1950 | Stemen et al. | 280/43.23 UX |
| 2,775,925 | 1/1957 | Greiner | 404/123 |
| 2,911,893 | 11/1959 | Archibald et al. | 404/124 |
| 3,240,008 | 3/1966 | McMullen | 280/43.23 X |
| 3,240,506 | 3/1966 | McMullen | 280/43.23 |
| 3,288,315 | 11/1966 | Bigden | 280/43.23 X |
| 3,431,980 | 3/1969 | Singer, Jr. | 172/40 |
| 3,575,006 | 4/1971 | Rugroden et al. | 172/40 X |
| 3,627,056 | 12/1971 | Rogers | 172/40 |
| 3,638,339 | 2/1972 | Vik | 172/40 X |
| 3,685,591 | 8/1972 | Ulrich et al. | 172/40 |
| 3,782,480 | 1/1974 | Schmahl | 61/72.6 X |

*Primary Examiner*—Edgar S. Burr
*Attorney, Agent, or Firm*—Gary, Juettner

[57] ABSTRACT

A slit trenching and cable laying device includes: a frame held above the ground by a support, preferably adjustable to various levels above the ground, a plow for digging a slit trench and laying a cable or line therein, the plow being mounted so as to be relatively movable with respect to the frame, a mechanism for imparting a digging motion to the plow, preferably, adjustable to impart a variable motion and being adapted to be driven by a vehicle towing the device, and another mechanism for imparting a motion to the plow for reducing surface contact and resultant drag between the plow and the sides of the trench, preferably adjustable for varying the magnitude of the motion as conditions warrant.

23 Claims, 10 Drawing Figures

SLIT TRENCHING AND CABLE LAYING DEVICE

BACKGROUND OF THE INVENTION

Heretofore, a prior art slit trenching and cable laying device, such as that shown in the prior U.S. Pat. No. 3,685,591 included a frame on which was mounted a relatively movable plow for digging a slit trench and laying a cable or line in the trench. The prior art plow usually had a digging motion confined to a vertical plane. In certain soil conditions, such as heavy clay or moisture, considerable power was needed to operate the plow since large surface areas on both sides of the plow were in contact with both sides of the trench. The large area surfaces in contact created large drag forces which could stall the plow or slow its operation.

In the past one approach to overcoming this problem was to provide the device with its own powerful engine. While the large engine did, to some degree, alleviate the drag problem, it created its own disadvantages, such as increasing the cost, bulk and weight of the device. Further, because of its large bulk and weight such device usually operated at only one trench depth, it being difficult and expensive to provide means to alter the operating depth. Of course such device had the disadvantage of not digging the minimum depth trench necessary on each application.

BRIEF DESCRIPTION OF THE INVENTION

The slit trenching and cable laying device of the present invention has overcome the foregoing disadvantages and comprises: frame means, support means for holding said frame means above the ground, plow means for digging a slit trench and laying a cable or line therein, first means for imparting a digging motion to said plow means, and second means for imparting a motion to said plow means for reducing surface contact and resultant drag between the sides of said plow means and the sides of the trench. The imparted motion of the plow forces one side and then the other side of the plow out of contact with the trench sides so that surface contact and drag is reduced or cut in more than half. Also, the imparted motion causes the plow to cut a trench slightly wider than the plow width to further reduce drag on the plow. Preferably, means are provided for adjusting the magnitudes of both the imparted motions for various conditions so that only the minimum energy necessary is used.

The features of the present invention permit the device to be easily driven by a low horsepower source. The device does not need its own powerful engine, but can be driven by the auxiliary power systems of another vehicle which can also be used to move or tow the device. For example, the device could be powered by the power-take-off (P.T.O.) shaft or hydraulic system of a farm tractor, the tractor also towing the device.

To further reduce the power required and operating cost, the support means of the device of the present invention has been made adjustable so that the plow may be operated at the desired level to dig the minimum depth trench required. In one form the support means comprises a pair of wheels pivotally mounted to each side of the frame by a pair of wheel arms. The wheel arms are interconnected by means for pivoting the wheels together or apart to alter the level of the plow. In another form, it has been possible to use a conventional three point adjustable hitch to support the device since the device is comparatively light in weight, not having its own heavy engine.

DESCRIPTION OF THE PREFERRED EMBODIMENTS

Figures 1, 2, 7:
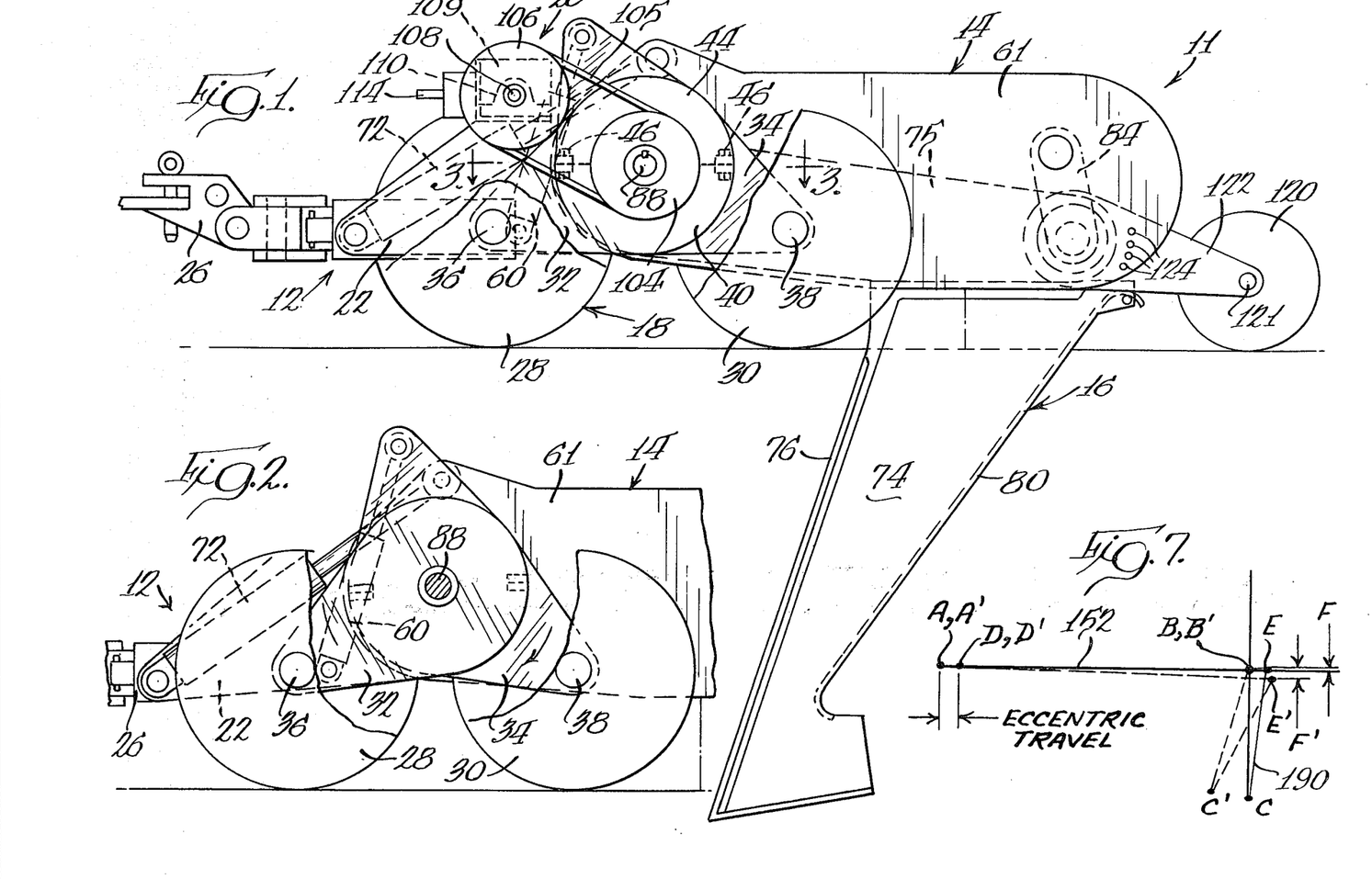
FIG. 1 is an elevational view of one embodiment of slit trenching and cable laying device of the present invention, the device being shown in one position.
FIG. 2 is a fragmentary elevational view of the device shown in FIG. 1 but in a second position.
FIG. 7 is a schematic diagram illustrating a portion of the motion of the device of FIG. 4.
Figure 3:
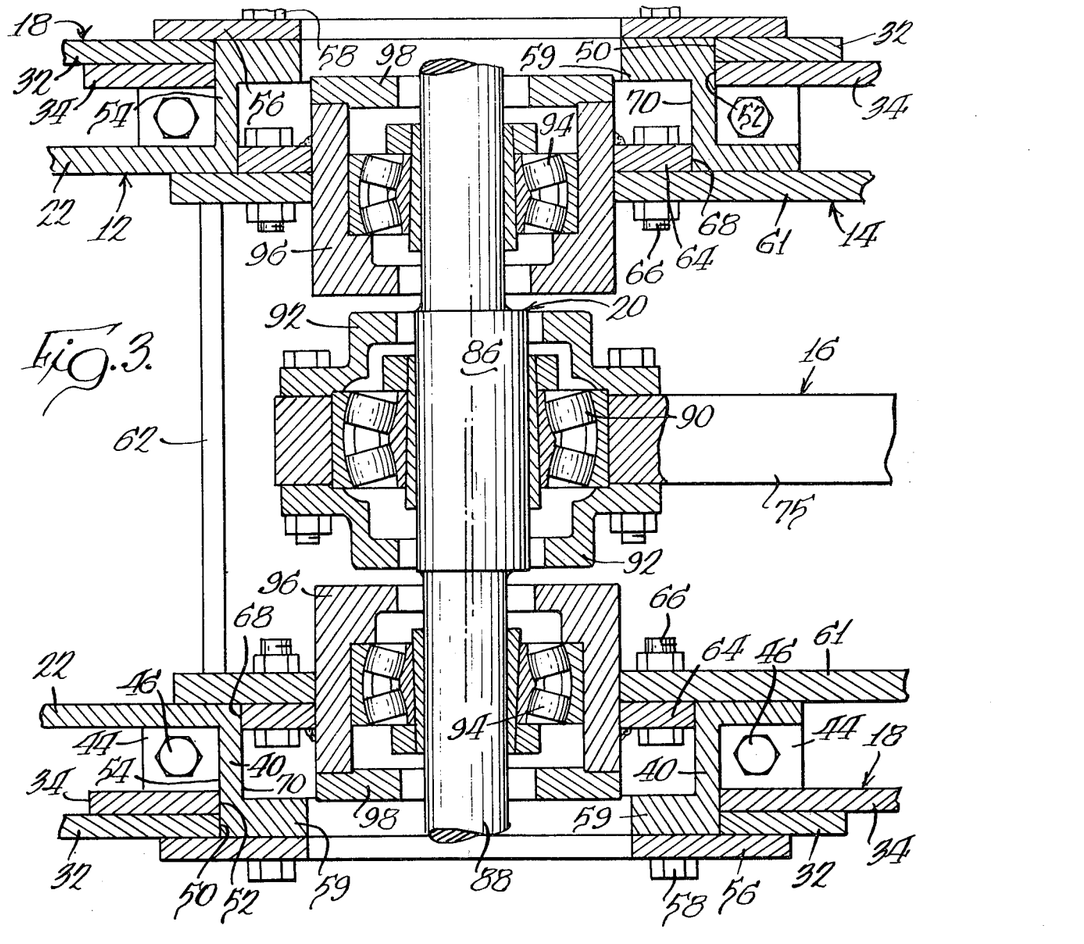
FIG. 3 is an enlarged fragmentary cross-sectional view taken on the line 3—3 of FIG. 1.

FIGS. 1 through 3 illustrate one embodiment of slit trenching and cable laying device 11 of the present invention which may be used for burying electric cable or lines such as drainage lines. While the slit trenching and cable laying device could have been of the self-propelled type, in this instance, the device 11 is especially adapted to be towed and powered by a conventional tractor of low horsepower, such as a 60 horsepower farm tractor. While using only a 60 horsepower tractor, the device of the present invention can easily dig a trench with a depth in excess of 40 inches which is suitable for most purposes.

Generally, the slit trenching and cable laying device 11 comprises a primary frame 12 adapted to be pulled by the tractor, a secondary frame 14 mounted on the primary frame and carrying a slit trenching and cable laying plow 16, support means 18 for the plow for digging the trench and laying the cable at the desired level below the ground, first means 20 for powering and imparting the desired digging motion to the plow, and second means (shown in subsequent FIGS.) for imparting the desired drag reducing motion to the plow.

In detail, the primary frame 12 comprises a pair of side plates 22 rigidly joined by cross members (not shown). The forward end of the primary frame 12 carries a hitch 26 which is adapted to be connected to the drawbar of the tractor for towing the device 11. The primary frame also pivotally carries the secondary frame and means for raising and lowering the same to position the plow for digging or transport, as will be hereinafter described.

As is shown in FIGS. 1 and 2, the primary frame 12 can be held at various levels above the ground by support means 18 which will now be described. Support means 18 also provides the adjustment for varying the operating depth of the plow 16 and for regulating the depth the cable is layed. Support means 18 includes two pairs of wheels, forward wheels 28 and rearward wheels 30, one of each of the forward and rearward wheels being located on each side of the frame. Each of the wheels 28 is carried on its own forward wheel arm 32, and each of the wheels 30 is carried on its own rear wheel arm 34. The wheels 28 and 30 are rotatably mounted on short shafts 36 and 38 extending outwardly from the wheel arms 32 and 34, respectively. As is shown in FIG. 2, the forward wheel arm 32 is generally "teardrop" shaped, the small end thereof having the shaft 36 secured thereto. The large end of the arm 32 is pivotally mounted to the primary frame 12, as will be hereinafter described. The wheel arm 34 is generally triangularly shaped, one corner of the triangularly shaped wheel arm 34 having the shaft 38 secured thereto. The center of the arm 34 is pivotally mounted to the primary frame 12 in a manner similar to that of the arm 32, as will now be described.

As is shown in FIG. 3, a hub for mounting the wheel arms 32 and 34 is provided on each of the plates 22 of the primary frame 12. The hubs are formed by integral, lower semi-cylindrical portions 40 of the plates 22 and two upper, semi-cylindrical caps 44 (FIG. 1) secured, as by bolts 46, to the lower portions 40. The wheel arms 32 and 34 have large diameter cylindrical openings 50 and 52, respectively, which engage the outer cylindrical surfaces 54 of these hubs to concentrically mount the wheel arms to the primary frame. The wheel arms 32 and 34 are retained on the hubs by retaining flanges 56 secured, as by bolts 58 engaged in threaded openings in inner radial flanges 59 of the hubs. Thus, the wheel arms 32 and 34 can concentrically pivot on the hubs of the primary frame.

As was mentioned, support means 18 includes means for adjusting the height of the primary frame 12 and the secondary frame 14 above the ground and the depth of the plow 16 to various desired levels. This adjustment means includes a pair of hydraulic cylinders 60, each of which is pivotally mounted at its ends to its associated wheel arms 32 and 34. As shown in FIG. 1, the lower end of each of the hydraulic cylinders 60 is secured to the wheel arm 32 adjacent the shaft 36, and the upper end of the hydraulic cylinder 60 is secured to the wheel arm 34 at its corner opposite the shaft 38. This arrangement places the hydraulic cylinders 60 forward of the hubs of the frame on which the wheel arms 32 and 34 are mounted. Should the hydraulic cylinders 60 be extended, the wheels 28 and 30 pivot toward each other to raise the primary frame, the secondary frame and the plow. Conversely, should the hydraulic cylinders 60 be contracted, the wheels 28 and 30 pivot away from each other and lower the primary frame, the secondary frame and the plow. Of course the hydraulic controls for the two cylinders 60 may be operated independently so that the wheels 28 and 30 on one side of the frame can be set at one level and the wheels on the other side can be at a different level to hold the frames level on uneven ground. The hydraulic controls for the cylinders 60 may be conveniently located and reachable by the tractor operator.

The secondary frame 14 carries the plow 16 and other portions of the means 20 for powering the plow, and comprises a pair of laterally spaced vertical plates 61 held apart by various cross members, such as the cross member 62 shown in FIG. 3. The secondary frame 14 is pivotally mounted on the primary frame 12 so that the plow 16 may be raised entirely out of the ground for transport. This pivotal connection between the primary and secondary frames is shown in FIG. 3 and will now be described. The plates 61 of the secondary frame have annular rings 64 secured thereto, as by bolts 66, and the outer cylindrical surfaces 68 of the rings 64 are sized to closely engage the inner cylindrical surfaces 70 of the hubs (formed by 40 and 44) of the primary frame to pivotally connect the secondary frame thereto. Hydraulic cylinders 72 (FIG. 1) are connected between the secondary frame and the primary frame, so that contraction of the cylinders 72 will pivot the secondary frame 14 counter-clockwise about the hubs of the primary frame and raise the plow 16 to a position completely above the ground for transport. Again, the controls for the hydraulic cylinders 72 may be conveniently located to be reachable by the tractor operator. Of course for small size plows, say those capable of trench depths less than 18 inches, the frame could be unitary and the support means utilized to elevate the plow to a transport position.

The plow 16 has a lower vertical blade 74 and a horizontal arm 75. The blade 74 and arm 75 generally lie in a vertical plane on the longitudinal axis of the device 11. The blade 74 of the plow, when operated, forms the slit trench and has a sharp leading edge 76 for cutting through the ground. The trailing edge 78 of the blade has a curved lip 80 for guiding the cable or line being laid as in conventional. The vertical blade 74 is rigidly secured to the horizontal arm 75.

The horizontal arm 75 of the plow extends between the plates 61 of the secondary frame, and the horizontal arm 75 is suspended or supported on the secondary frame in a manner permitting motions which will hereinafter be more fully described. For the present, it is sufficient to note that, as shown in FIG. 1, the right or rear end of the horizontal arm 75 is suspended from the lower end of a connector or link 84 which has an upper end indirectly pivotally secured to the secondary frame, and the left or forward end of the horizontal arm 75 is connected to and supported by portions of powering means 20, as will now be described.

Referring to FIG. 3, the forward end of the horizontal arm 75 of the plow is mounted on an eccentric cylindrical portion 86 of a rotatable transverse shaft 88. Preferably, for reasons which will hereinafter become apparent, the horizontal arm 75 is mounted on the eccentric 86 by a center spherical bearing 90. A spherical bearing Model No. FC-B 22432H produced by the Link Belt Corporation is suitable for such application. The bearing 90 is contained within two housing halfs 92 secured to the plow arm 75. The shaft 88 is rotatably mounted, concentrically with the pivot center of the primary and secondary frames, in two outer spherical bearings 94. While outer spherical bearings are not necessary, they are used because of their superior load capacities. The outer spherical bearings 94 are located in cylindrical bearing housings 96 secured, such as by welding, to the annular rings 64 on the secondary frame. The outer ends of the housings 96 are partially closed by annular plates 98. The shaft 88 extends through amply clearanced openings in the housings 92 and 96 and plates 98, out beyond the plates 22 and 61 of primary and secondary frames, and out beyond the wheel arms 32 and 34.

While the device 11, particularly the shaft 88, could be driven by various means, such as an internal combustion engine, it is advantageous to use the towing tractor to drive the device and shaft. Further, to isolate the pulsations of the eccentric shaft 88 from the remainder of the drive, preferably, as shown in FIG. 1, the shaft 88 has a pair of belt driven combination pulley-flywheels 104 mounted on its ends. The pulleys 104 are of large size and heavy weight so as to have large moments of inertia for "smoothing out" pulsations of the eccentric drive and storing kinetic energy. Of course the size and weight of the combination pulley-flywheel used will vary with the size plow and trench capacity of the device. The table below provides sufficient information for a person skilled in the art to select a workable pulley-flywheel for various size devices.

| Trench Width Inches | Maximum Trench Depth Inches | Eccentric Shaft Speed RPM | Outside Diameter Inches | Width Inches | Weight lbs. |
|---|---|---|---|---|---|
| 1 | 24 | 2500–3000 | 12 | 4 | 125 |
| 2 | 36 | 2000–2500 | 16 | 4 | 200 |
| 3 | 48 | 1800–2000 | 20 | 6 | 250 |

Each of the pulleys 104 is driven by a plurality of flexible belts 105 engaging a similar large and heavy pulley-flywheel 106. The pulleys 106 also assist in storing kinetic energy so that the relatively low power tractor can be used. Each pulley 106 is secured to an end of an output shaft 108 of a gear box 109. The ends of the shaft 108 are rotatably mounted in bearings 110 on the primary frame. The gear box 109 is also secured to the frame and has an input shaft 114 which is adapted to be coupled to the P.T.O. shaft (not shown) of the tractor. Thus, power is supplied from the P.T.O. shaft of the tractor to the shaft 114 of the gear box 109, to its output shaft 108. The output shaft 108 drives the pulleys 106, in turn driving the belts 105, rotating the pulleys 104, and the eccentric shaft 88, to power the plow 16. Pulleys 106 can be used to counterbalance the end of the plow arm, such as by adding counterweights or drilling lightening holes.

As can be appreciated, as the eccentric shaft 88 rotates, the forward end of the horizontal arm 75 oscillates in a vertical plane with a circular motion. This oscillatory circular motion of the arm 75 is modified by the pivotal connector or link 84 connecting the rear end of the horizontal arm 75 so that the lower vertical blade 74 oscillates in a vertical plane with an elliptical motion similar to that described in the previously mentioned U.S. patent. As was therein discussed, this elliptical motion in the vertical plane can be varied from almost straight line motion to elliptical or circular motion depending upon the location of the upper end of the link 84, and while not shown, it should be understood that the device 11 has means for varying this motion, as described in said U.S. Pat. 3,685,591.

Further, while not shown, it should be understood that the device 11 has additional means for imparting motion to the plow for reducing surface contact and drag of the plow, as will be hereinafter described for the other embodiments. Also, it should be understood that the device 11, as well as the other embodiments may be equipped with stanchions for holding a cable reel, as is well known in the art.

The trenching and cable laying operation of the device 11 is similar to that of the other embodiments, and the operation of device 11 will be apparent from the described operation of the other embodiments.

After the trench is dug and the cable is layed, the trench must be closed. At its rear the device 11 has a cover up wheel 120 for accomplishing this task. The cover up wheel 120 is mounted on an axle 121 secured to a pair of bracket arms 122, which in turn are pivotally mounted on the secondary frame. To provide an adjustment for the cover up wheel 120, the plates 61 of the secondary frame have a plurality of openings 124 for receiving a pin that also extends into openings in the bracket arms 122. This construction can hold the cover up wheel 120 in contact with the ground no matter what height the secondary frame may be above the ground.

Figure 4:
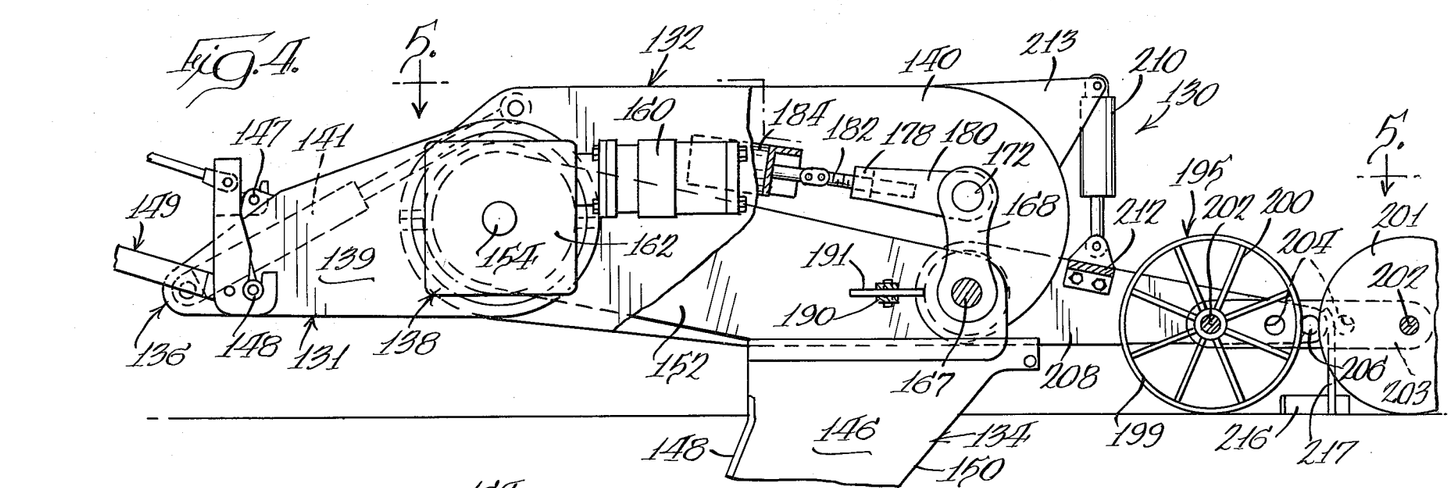
FIG. 4 is an elevational view with portions broken away of a second embodiment of slit trenching and cable laying apparatus of the present invention.
Figure 5:
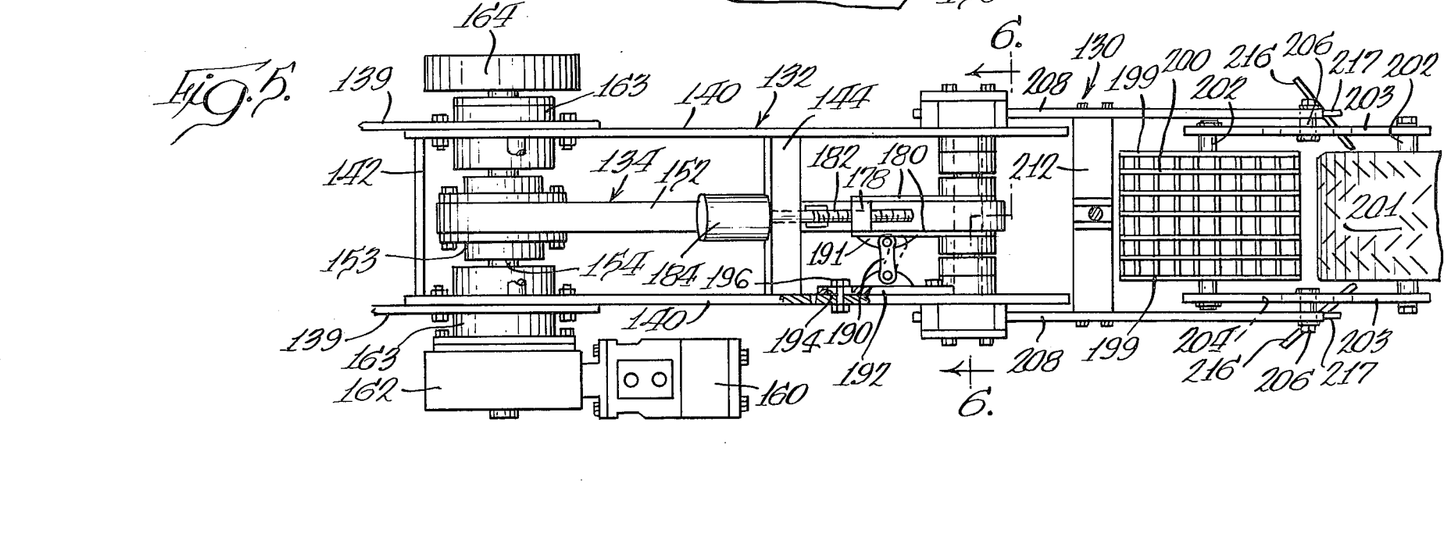
FIG. 5 is a view taken on the line 5—5 of FIG. 4.
Figure 6:
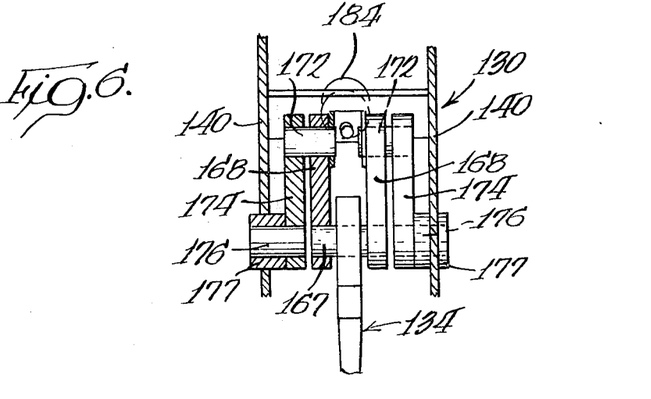
FIG. 6 is a cross-sectional view taken on the line 6—6 of FIG. 5.

A second embodiment of slit trenching and cable laying device 130 is shown in FIGS. 4 through 6. The slit trenching and cable laying device 130 is similar to the device 11 in that the device 130 comprises a similar primary frame 131 carrying a pivotable secondary frame 132 and a similar slit trenching and cable laying plow 134. The device 130 is different from the device 11 in that it comprises different support means 136 for holding the plow and frames at the desired levels and different means 138 for powering the plow.

In detail, as shown in FIG. 5, the primary frame 131 comprises a pair of laterally spaced vertical plates 139 joined by cross members (not shown), and the secondary frame 132 comprises a pair of laterally spaced vertical plates 140 secured together by cross members, such as the members 142 and 144. Again, the primary frame pivotally carries the secondary frame, and a pair of hydraulic cylinders 141 are connected between portions of the frames to move the plow between an operating position and a transport position.

In this instance, the primary frame 131 is supported above the ground by support means 136 in the form of portions 147 and 148 of a three point hitch on the frame adapted to be connected to other portions 149 of an adjustable three point hitch on the tractor. As is well known, the three point hitch can be used to carry an implement, such as device 130, at various levels parallel to the ground by adjustment of the hitch. The hitch, also, provides means for connecting the device 130 to the tractor. The use of the three point hitch to support an eccentrically driven plow is possible only because the device 130 including its eccentric drive is relatively light weight.

The plow 134 is similar to the plow 16 previously described. The plow 134 has a lower vertical blade 146 having a sharp leading edge 148 for digging the trench and a lipped trailing edge 150 adapted to engage and guide the cable or line during the laying operation. The upper end of the lower vertical blade is rigidly connected to an upper horizontal arm 152. As illustrated in FIG. 5, the left or forward end of the arm 152 is connected, as in FIG. 3, by means of a spherical bearing assembly 153 to an eccentric shaft 154 mounted concentric with the pivot axis of the primary and secondary frames. The shaft 154 is similar to the shaft 88 and is similarly mounted to the frame.

Powering means 138 for the plow 134 is different from that shown for the device 11 in that the eccentric shaft 154 is driven by a separate hydraulic motor 160 which is adapted to be powered by the hydraulic system of the tractor. The use of the separate hydraulic motor has the advantage over using the P.T.O. shaft in that the tractor movement is independent of the digging speed. Thus, in situations where digging is difficult, the plow may be operated at full power while the tractor barely moves, and yet the power for driving the plow is derived from the tractor. The motor 160 is secured to a gear box 162 which in turn is secured to a housing 163 for the outer bearing of the shaft 154. The bearing housing 163, is similar to the housing 98, and is secured to the secondary frame. A flywheel 164 is secured to the opposite end of the shaft 154 to assist dampening the pulsations of the eccentric shaft 154 and to store kinetic energy. Like the means 20 for the plow 16, means 138 causes the forward end of the horizontal arm 152 of the plow 134 to oscillate with a circular motion in a vertical plane.

The oscillating motion of the forward end of the plow 134 is modified by the swinging suspension for the rear end of the horizontal arm 152. As shown in FIGS. 4–6, the rear end is suspended from a center shaft 167 extending between bottom ends of a pair of inner connectors or links 168 which pivot about their upper ends. The links 168 convert the simple circular oscillating motion of the arm to an elliptical motion in the longitudinal vertical plane so that the plow 134 has a digging and laying action like that described in the previously mentioned U.S. patent. The pivot point and the location of the upper end of the inner links 168 may be varied or adjusted to change the proportions of the elliptical motion. Each of the upper ends of the links 168 has an upper stub shaft 172 extending outwardly therefrom. A pair of support arms 174 have upper ends engaged on the stub shafts 172 and are pivotally connected at their lower ends by lower stub shafts 176 to bosses 177 on the plates 140 of the secondary frame. This construction permits the loci of the upper ends of the links 168 to pivotally vary about the lower ends of the support arms 174. The construction has the advantage of transmitting the imposed loads of the plow to the rugged shaft 167, links 168, upper stub shafts 172, support arms 174, and lower stub shafts 176, to the secondary frame.

Adjustable means are provided to move and hold the pivotal axis of the plow arm 152 and of the upper ends of the links 168 in various positions. While this adjustment could be manually made, in this instance the adjustment means is power operated so that the adjustment can be made by the tractor operator. Adjustment means includes a U-shaped yoke 178 having a center from which extends two outer arms 180. The ends of the arms 180 have openings receiving the inner ends of the upper stub shafts 172 to pivotally connect the yoke to these shafts. The center of the yoke has a threaded opening receiving one end of a threaded rod 182. The other end of the threaded rod 182 is suitably coupled to the output shaft of a motor 184, such as a hydraulic or electric motor. The motor 84 is suitably mounted on a cross member 144 of the frame and can rotate the threaded rod 182 in either direction to change the pivot point for the links 168 and vary the elliptical motion of the plow.

The plows of the devices of the present invention not only have first means providing an oscillatory motion in the longitudinal plane of the trench, but also have second means for imparting motions transverse to the plane of the trench. The movement of the plow in the transverse direction of the trench significantly reduces the power required to dig the trench since it greatly reduces the surface area of the blade of the plow in contact with the ground. This feature permits using a small horsepower tractor to power the device of the present invention and allows a trench to be quickly dug even in heavy clay soil. The transverse movement has another advantage in that it permits the device to dig a trench of a width somewhat greater than the width of the plow blade.

While independent means could have been provided for producing the transverse movement of the plow blade, such as by a separate motor, preferably, the transverse movement is provided by converting or translating the movement of the plow in the longitudinal direction to a transverse direction. While various means could have been provided, such as cams, to do so, in this instance linkage means cooperating between the plow and frame has been used. In particular, a link 190 is pivotally connected between the frame and plow so that as the plow moves back and forth longitudinally due to the eccentric shaft rotation, the link 190 cause the plow to move from side to side. One end of the link 190 is pivotally secured to a horizontal web 191 secured to the plow arm 152, and the other end of the link 190 is pivotally secured to an adjustable bracket 192. The bracket 192 in turn has elongated longitudinal slots 194 which receive bolts 196 for adjustably securing the bracket to the secondary frame. Adequate clearance is provided between the links 168 and the plow 134 to permit transverse lateral movement of the plow on the shaft 167.

The transverse movement of the plow 134 of the device 130 is schematically illustrated in FIG. 7 and will now be described. Assume that the arm 152 of the plow 134 is at its forwardmost extreme of travel, represented by the line AB, and link 190 is represented by the line BC, with the point C being pivotally fixed to the frame. As the forward end of the arm moves rearward longitudinally due to the eccentric travel from point A to point D, the rear end thereof moves rearward, but also pivots about point C so that the plow arm is represented by the line DE and the link is represented by the line CE. A transverse movement of the plow and its blade of a magnitude F is produced. This movement causes one side of the plow blade to move away from a side wall of the trench to reduce surface contact and drag. Of course the other side moves out of contact when the plow moves forward again. Thus, only one surface of the plow blade is in contact with the side walls of the trench at any one time.

The magnitude of the transverse travel of the plow can be altered by changing the pivot point of the link to either the plow or the frame. In the device 130, the pivotal connection provided by the mounting bracket 192 can be changed by losing the bolts 196, repositioning the bracket and tightening the bolts. The effect of such a change is schematically illustrated in FIG. 7 for a change of the pivot point of the link 190 from point C to point C'. The forwardmost position of the plow arm is represented by the line A'B' and that of the link by B'C'. As the arm moves rearward to D'E' and the link pivots to C'E', an increased transverse movement F' is produced. Generally, the transverse movement will be smallest when the link 190 is adjusted to be perpendicular to the plow arm 75 when at its mid-point of longitudinal travel. The magnitude of the transverse movement need not be great, and a movement as small as 0.05 inches proves beneficial in reducing surface drag of the blade in the ground.

The small magnitude of both the transverse movement and the elliptical movement of the plow permits relatively simple linkage to be used. The linkage illustrated will operate satisfactorily within the normal range of movement contemplated. Further, any pivotal movement of the forward end of the arm 152 can be easily accommodated by the spherical bearing 153, similar to bearing 90 of device 11, for mounting the arm 152 to the eccentric shaft 154.

With the exception of the slight side to side motion of the plow, the operation of digging the trench and laying the cable is very similar to that of the device of the previously mentioned U.S. patent and will not be described.

As is shown in FIGS. 4 and 5, the device 130 is fitted with a covering unit 195 having wheels 200 and 201 for closing and filling the trench after the cable or line has been layed. Preferably, the wheel 200 has a pair of circular spoked disks 199 at its outer ends on which are mounted a cylindrical screen of relatively large open mesh. The wheel 200 is preferably steel and breaks up the lumps of dirt and fills the trench. The wheel 201 is a rubber tire having a relatively smooth surface for smoothing the top surface of the filled trench. The wheels 200 and 201 are of large width and are mounted on axles 202. The axles 202 in turn are mounted to sides frames 203. The center portion of each side frame 203 has a plurality of openings 204, one pair of which receives ends of short axles 206. The other openings 204 may be used, if it is desired, to change the relative pressure of the wheels 200 and 201 on the ground for a particular situation. The outer ends of the axles 206 are mounted to the ends of two bracket arms 208 extending from the rear of the secondary frame. The other ends of the bracket arms 208 are pivotally secured to the plates 140 to permit a vertical adjustment of the wheels 200 and 201. Adjustment means in the form of a hydraulic cylinder 210 is provided to raise or lower the wheels 200 and 201. One end of the cylinder 210 is pivotally connected to a cross member 212 secured to the brackets arms 208, and the other end of the cylinder 210 is pivotally connected to a portion 213 of the secondary frame. Thus, the wheel 200 and 201 may be carried at ground level no matter what the height of the frames and depth of the plow.

In addition the covering unit 195 may be fitted with a pair of inwardly and rearwardly extending vertical plow boards 216, one on each side of the wheel 202. Preferably, the plow boards 216 are adjustably and removably secured to the covering unit 195, such as by rods 217 having one end secured to the unit 195 and the other end secured to the boards 216. The plow boards 216 catch any material passing through the spoked disks 199 of the wheel 200 and channel the material in front of the smoothing wheel 201. The plow boards are particularly useful in gravel which tends to escape through the spokes of the wheel 200.

Figure 8:
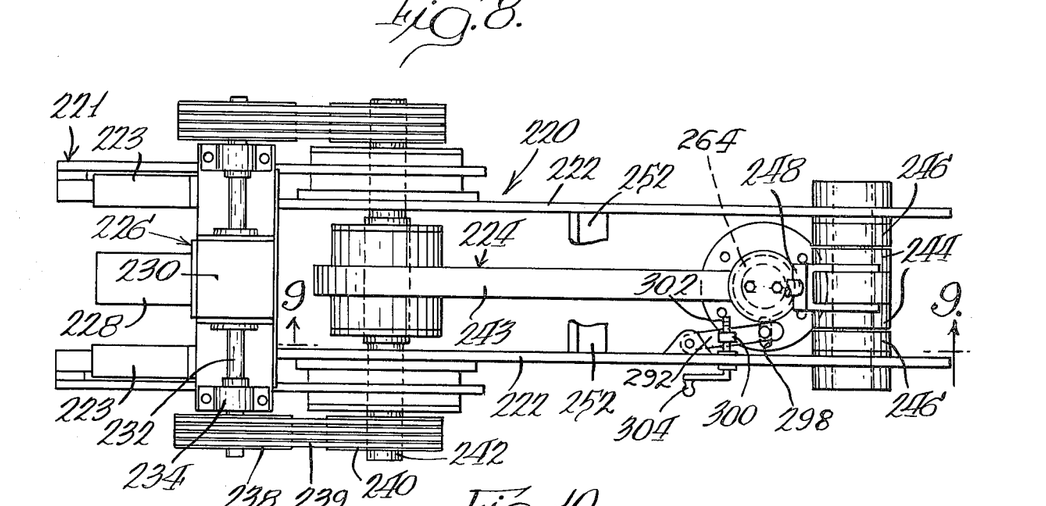
FIG. 8 is a plan view of a third embodiment of slit trenching and cable laying device of the present invention.
Figures 9, 10:
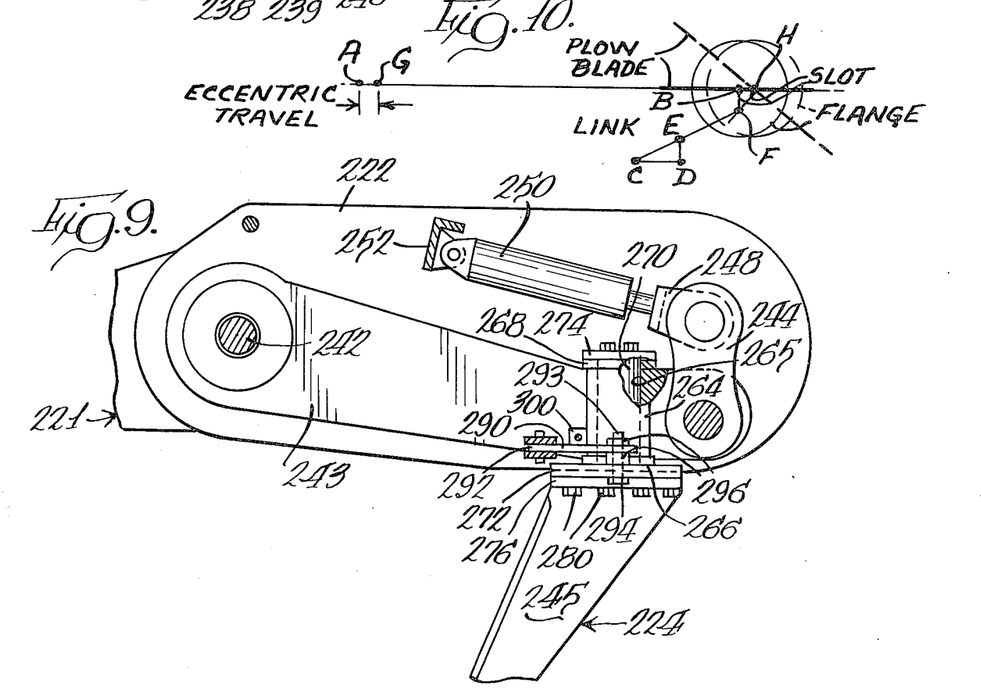
FIG. 9 is a fragmentary cross-sectional view taken on the line 9—9 of FIG. 8.
FIG. 10 is a schematic diagram illustrating a portion of the motion of the device of FIG. 8.

A third embodiment of slit trenching and cable laying device 220 of the present invention is shown in FIGS. 8 and 9. The device 220 has a primary frame 221 and a secondary frame 222, these being similar to the frames of the devices 11 and 130. Hydraulic cylinders 223 mounted between the frames 221 and 222 raise the secondary frame and a plow 224 mounted thereon to a transport position. The device 220 further includes first means for imparting a digging motion and second means for imparting a friction or drag reducing motion to the plow 224. Portions of these first and second means are mounted on each of the frames 221 and 222.

The first means for imparting motion to the plow for digging is similar to that of the device 11, but like that of the device 130, uses a hydraulic motor 228 adapted to be powered by the hydraulic system of the tractor, instead of using the P.T.O. shaft. The hydraulic motor 228 is connected to and drives a gear reduction box 230 having a transverse output shaft 232. The outer ends of the output shaft 232 are rotatably mounted in bearings 234 secured to the primary frame. The outer ends of the shafts 232 are also fitted with pulleys 238, similar to pulleys 104 and 106, and the pulleys 238, through belts 239, drive similar pulleys 240. The pulleys 240 are mounted on the ends of an eccentric shaft 242 which drives the plow 224.

The plow 224 has a horizontal arm 243 and a lower blade 245. The forward end of the horizontal arm 243 is supported and suspended by the eccentric shaft 242 in a manner similar to the arm 75 on the shaft 88 of the device 11, with the exception that in this case the bearing need not be spherical. The rear end of the arm 243 is pivotally suspended from the lower ends of a pair of connectors or links 244. The upper ends of the links 244 are pivotally connected to a pair of outer links 246 having their lower ends pivotally secured to the secondary frame, in this regard, the device 220 being similar to the device 130.

In the device 220 to adjust the location of the pivot point of the connectors or links 244, a yoke 248 and hydraulic cylinder 250 are used, instead of the yoke 178, threaded rod 182 and motor 184 of the device 130. As is shown in FIG. 9 (but omitted from FIG. 8), one end of the hydraulic cylinder 248 is pivotally secured to a cross member 252 of the secondary frame, and the other end is pivotally connected by the yoke 248 to the upper end of the links 244. Thus, extension or contraction of the hydraulic cylinder 250 changes the axis about which the rear end of the plow arm 243 swings.

The plow 224 is different from those of the devices 11 and 130 in that the blade 245 is relatively movable with respect to the horizontal arm 243. Thus, though the blade moves in a transverse direction to reduce friction or drag, the horizontal arm need only move longitudinally. While the relatively movable connection between the upper and lower portions of the plow could have been made in various ways, preferably the lower blade 245 is pivotally secured to the horizontal arm 243. As shown in FIG. 9, the arm 243 adjacent its rear has an integral hub 264 having a vertical opening 265, the ends of the hub terminating in thrust faces 266 and 268. The lower blade 245 has a vertical shaft 270 which extends through the hub 264 to pivotally mount the blade to the arm. The shaft 270 extends above and from a wide diameter flange 272, and the upper surface of the flange 272 abuts the lower thrust face 266 of the hub 264. The shaft 270 is retained in the hub 264 at its upper end by a retainer 274 abutting the upper face 268 of the hub, the retainer being bolted to the shaft. The interfaces of the hub and shaft, including the upper and lower thrust faces, may be provided with suitable bearings. The lower blade 245 has an upper horizontal flange 276 which is secured, as by welding, to the vertical portion of the blade. The upper flange 276 is suitably secured to the lower flange 272 of the shaft 270, as by bolts 280. The bolts 280 are engaged in threaded openings in the flange 272. Thus, the lower blade 245 is pivotally secured to the horizontal arm 243 and can move longitudinally with the arm, but has a pivotal movement including a transverse component with respect to the horizontal arm.

Again while independent means for imparting the transverse or friction reduction motion to the plow blade could have been provided, in this instance this second motion means has been connected to the plow and converts the longitudinal movement of the horizontal arm to the desired movement of the blade. In addition, the second means has been constructed to be adjustable while in operation. While a power-adjustable means could have been provided, a manually adjustable means is shown, and comprises linkage means cooperable between the frame and plow arm to cause the desired movement. More particularly, a link 290 is provided and is pivotally connected at one end 292 to the secondary frame. The other end of the link has an opening which receives the upper end of a pin or threaded bolt 293. The bolt 293 has a head 294 at its bottom and is held in position in the link 290 by a pair of nuts 296. An intermediate portion of the bolt 293 is slidably received in a generally radial slot 298 in the flange 272, the slot being arranged generally transverse of the frame.

The link 290 may be located and held in various positions with respect to the frame. The link 290 has an intermediate threaded portion 300 (FIG. 8) which receives a threaded shaft 302. The outer portion of the shafts is rotatably mounted on the frame and has a crank handle 304 attached. Thus, as is apparent, rotating the crank handle 304 in either direction causes the link 290 to move in or away from the frame and the bolt 293 to slide relatively in the slot 298. The change in the position of the bolt 293 in the slot 298 changes the pivot point about which the flange 272 and blade pivot to alter the magnitude of the imparted friction reducing motion.

The operation of the second means for imparting the desired friction reducing or transverse motion is schematically illustrated in FIG. 10. Assume the plow arm 243 is in its extreme forward position and represented by the line AB; the end of the link is pivotally connected to the frame at point C, but is held in position by the threaded rod represented by the line DE. The bolt 293 on the link 290 engages the slot 298 (represented by the solid radial line) at point F. As the horizontal arm 243 moves rearward to the position GH, the flange 272, shaft 270 and lower blade 245 all tend to pivot clockwise, the slot 298 and flange 272 pivoting relatively about the bolt 293, to the positions shown in dashed lines. The pivotal movement has both a transverse and longitudinal component, the former tending to reduce the frictional drag and surface contact as was previously discussed. As can be appreciated the magnitude of this movement in relation to the magnitude of the longitudinal movement depends upon the relative radial position of the bolt 293 in the slot 298. The closer the bolt 293 is to the center of the shaft 270, the greater the magnitude, and conversely, the further away, the lesser the magnitude. The relative position of the bolt 293 in the end of the link 290 can be varied by turning the crank handle 304.

While not shown it should be understood that the device 220 would be equipped with support means for holding the frame above the ground and a hitch for connecting the device to a vehicle such as a tractor.

While only several embodiments of the slit trenching and cable laying device of the present invention have been shown and described, it is to be understood that variations, modifications, and equivalent structures fall within the scope of the appended claims.

What is claimed is:

1. In a slit trenching and cable laying device, in combination, frame means, support means for holding said frame means above the ground, said frame means carrying plow means for forming a trench and laying a cable or line therein, first means on said frame means for imparting an oscillating digging motion to said plow means in the plane of the trench, and second means on said frame means for imparting a motion to said plow means to reduce the surface contact between said plow means and the sides of the trench, whereby the power necessary to drive said device is reduced.

2. The invention of claim 1, wherein said first means and said second means are operably connected together and dadapted to be driven by the same power source.

3. The invention of claim 2, wherein one of said first and second means is adapted to be driven by a vehicle for moving said device, and the other of said first and second means is driven from said one of said first and second means.

4. The invention of claim 1, wherein said first means imparts a longitudinal and vertical motion in the plane of the trench to said plow means, and said second means imparts a transverse motion generally perpendicular to the plane of the trench to said plow means.

5. The invention of claim 4, wherein said second means converts the longitudinal motion of said first means to said transverse motion.

6. The invention of claim 1, wherein said plow means has an upper arm portion and a lower blade portion pivotally secured to said upper arm portion, said second means being connected to said lower blade portion and pivoting said lower blade portion transversely of the plane of the trench.

7. The invention of claim 6, wherein one of said blade and arm portions of said plow means has a vertical shaft secured thereto and the other of said blade and arm portions has a vertical hub secured thereto, said shaft engaging in said hub to pivotally connect said blade and arm portions together.

8. The invention of claim 1, wherein said support means comprises portions of a three-point hitch secured to said frame means and adapted to cooperate with other portions of a three-point hitch carried by a vehicle for moving said device, whereby the height of said frame means above the ground and the depth of said plow means in the ground may be adjusted.

9. The invention of claim 1, wherein said support means comprises a pair of wheels on each side of said frame means, a wheel arm for each of said wheels, each of said wheel arms being pivotally mounted to said frame means, and movement means interconnected between the associated pair of wheel arms on each side of said frame means, said movement means pivoting said pair of wheels on each side of said frame means toward each other or away from each other to alter the height of said frame means above and the depth of said plow means in the ground.

10. In a slit trenching and cable laying device, in combination, frame means, support means for holding said frame means above the ground, said frame means carrying plow means for forming a trench and laying a cable or line therein, first means for imparting a longitudinal digging motion to said plow means in the plane of the trench, and second means for imparting a transverse motion to said plow means to reduce the surface contact between said plow means and the sides of the trench, whereby the power necessary to drive said device is reduced, said second means comprising linkage means pivotally connected between said frame means and plow means for causing the longitudinal motion of said plow means to produce said transverse motion of said plow means.

11. The invention of claim 10, wherein at least one of the pivotal connections of said linkage means is adjustable for varying the magnitude of the transverse motion of said plow means.

12. The invention of claim 11, wherein the pivotal connection of said linkage means to said frame means is longitudinally slidably adjustable.

13. In a slit trenching and cable laying device, in combination, frame means, support means for holding said frame means above the ground, said frame means carrying plow means for forming a trench and laying a cable or line therein, first means for imparting a digging motion to said plow means in the plane of the trench, and second means for imparting a motion to said plow means to reduce the surface contact between said plow means and the sides of the trench, said first means including an eccentric shaft mounted transversely on said frame means, said plow means extending longitudinally on said frame means, one end of said plow means being mounted and supported by said eccentric shaft, connector means for supporting the other end of said plow means, said connector means having one end pivotally connected to said plow means and another end pivotally secured to said frame means, said eccentric shaft longitudinally oscillating said plow means, said second means comprising linkage means connected between said plow means and frame means for converting the longitudinal oscillations of said plow means to a transverse motion, whereby said plow means is caused to transversely move in the trench to reduce surface contact between said plow means and the sides of the trench and the power necessary to drive said device is reduced.

14. The invention of claim 13, wherein said first means includes a spherical bearing for mounting said one end of said plow means to said eccentric shaft, whereby any transverse component of motion of said plow means is taken by said spherical bearing and not transmitted to said eccentric shaft.

15. The invention of claim 14, wherein said linkage means comprises a link having one end pivotally secured to one of said plow means and frame means, and bracket means longitudinally adjustably secured to the other of said plow means and frame means, the other end of said link being pivotally secured to said bracket means.

16. In a slit trenching and cable laying device, in combination, frame means, support means for holding said frame means above the ground, said frame means carrying plow means for forming a trench and laying a cable or line therein, first means for imparting a digging motion to said plow means in the plane of the trench, and second means for imparting a motion to said plow means to reduce the surface contact between said plow means and the sides of the trench, said plow means having an upper arm portion and a lower blade portion pivotally secured to said upper arm portion, said second means comprising linkage means pivotally connected to said frame means and said lower blade portion for pivoting said lower blade portion transversely of the plane of the trench.

17. The invention of claim 16, wherein said linkage means at one end is pivotally connected to said frame means, said blade portion providing a slot, the other end of said linkage means being slidably engaged in said slot, said second means further comprising adjustable means for holding and changing the position of said linkage means relative to said frame means.

18. In a slit trenching and cable laying device, in combination, frame means, support means for holding said frame means above the ground, said frame means carrying plow means for forming a trench and laying a cable or line therein, first means for imparting a digging motion to said plow means in the plane of the trench, and second means for imparting a motion to said plow means to reduce the surface contact between said plow means and the sides of the trench, said first means including an eccentric shaft extending transversely to the longitudinal axis of the frame means, one end of said plow means being mounted on said eccentric shaft, connector means for supporting the other end of said plow means, one end of said connector means being pivotally secured to said other end of said plow means, the other end of said connector means being pivotally mounted to said frame means, a yoke secured to said other end of said connector means, a threaded rod rotatably engaging said yoke, and motor means for rotating said threaded rod, said motor means being secured to said frame means, whereby rotation of said motor means moves said yoke and changes the pivotal axis of said other end of said connector means to alter the digging motion of said plow means.

19. In a slit trenching and cable laying device, in combination, frame means carrying plow means for forming a trench and laying a cable or line therein, means including a rotating shaft extending transversely of said frame means for imparting a digging motion to said plow means, support means for holding said frame means and said shaft at various levels above the ground for varying the depth of insertion of said plow means in the ground, said support means including a forward and a rearward wheel on each side of said frame means, wheel arms for each of said wheels, each of said wheels being mounted to one end of its associated wheel arm, the other end of each of said wheel arms being pivotally mounted to said frame means concentrically with said rotating shaft, and movement means on each side of said frame means connected to the respective wheel arms for pivoting said forward and rearward wheels on said wheel arms, said movement means being selectively operable to pivot said forward and rearward wheels on each side of said frame means toward each other or away from each other to level said frame means and said shaft relative to the ground and to alter the height of said frame means above and the depth of said plow means in the ground.

20. The invention of claim 19 wherein one of said wheel arms on each side is tear drop shaped, and its associated wheel is connected to the small end thereof, and the other of said wheel arms on each side is triangularly shaped, and its associated wheel is connected to one of the small ends thereof, the large ends of said one wheel arms and the centers of said other wheel arms being concentrically pivotally mounted to said frame means, each of said movement means being connected between said small end of said one wheel arm and the other small end of said other wheel arm.

21. The invention of claim 20, wherein said movement means comprises a hydraulic cylinder pivotally connected at its ends to its associated one and other wheel arms.

22. In a slit trenching and cable laying device, in combination, frame means, support means for holding said frame means above the ground, said frame means carrying plow means for forming a trench and laying a cable or line therein, and a covering unit behind said plow means for filling and closing said trench including a first forward wheel having a hollow interior formed by a cylindrical outer surface of an open mesh and a pair of disks at the ends for mounting said wheel, said open mesh receiving and discharging material therethrough, a second rearward wheel following said first wheel and having a smooth outer cylindrical surface, a pair of said frames, said first and second wheels being rotatably mounted to said side frames, and bracket means, said side frames being pivotally mounted to said bracket means, said bracket means being secured to said frame means, whereby a trench dug by said plow means is filled by material collected and discharged through said open mesh of said first wheel and is smooth closed by said second wheel.

23. The invention of claim 22, further comprising a pair of plow boards located between said first and ssecond wheels and secured to said covering unit, said plow boards extending inwardly and rearwardly toward said second wheel, whereby said plow boards channel material in front of said second wheel.

* * * * *